United States Patent [19]

Kitamura

[11] Patent Number: 4,711,315
[45] Date of Patent: Dec. 8, 1987

[54] VEHICLE CAR STEERING SYSTEM

[75] Inventor: Tomimasa Kitamura, Kashihara, Japan

[73] Assignee: Koyo Auto-Mech Co., Ltd., Nara, Japan

[21] Appl. No.: 921,347

[22] Filed: Oct. 20, 1986

[30] Foreign Application Priority Data

Oct. 19, 1985 [JP] Japan ................. 60-234076

[51] Int. Cl.$^4$ .............................. B62D 5/083
[52] U.S. Cl. ................... 180/132; 91/375 R; 91/382
[58] Field of Search ........... 180/132, 141, 142, 143; 137/625.21, 625.22, 625.23; 91/375 R, 375 A, 382

[56] References Cited

U.S. PATENT DOCUMENTS

| | | | |
|---|---|---|---|
| 4,421,010 | 12/1983 | Elser | 91/375 R |
| 4,421,011 | 12/1983 | Elser | 91/382 X |
| 4,465,101 | 8/1984 | Hasegawa | 91/382 X |
| 4,595,071 | 6/1986 | Mehren | 180/132 |

FOREIGN PATENT DOCUMENTS

| | | |
|---|---|---|
| 50-146028 | 11/1975 | Japan . |
| 51-79433 | 7/1976 | Japan . |
| 53-41852 | 11/1978 | Japan . |
| 58-167258 | 10/1983 | Japan . |
| 59-220455 | 12/1984 | Japan . |
| 61-1579 | 1/1986 | Japan ................. 180/132 |
| 1130502 | 12/1984 | U.S.S.R. ............ 180/132 |

Primary Examiner—John J. Love
Assistant Examiner—Charles R. Watts
Attorney, Agent, or Firm—Frishauf, Holtz, Goodman & Woodward

[57] ABSTRACT

A hydraulic power assisted vehicle steering system having an input member connected with a manual steering wheel to be rotated thereby, an output member coaxial with the input member and connected with a vehicle steering mechanism, a torsion bar connecting the input member with the output member, a hydraulic power assist cylinder provided in the vehicle steering mechanism, a control valve for selectively applying a hydraulic pressure to the cylinder to produce a hydraulic assist force. The control valve includes a valve member connected with the output member for limited axial displacements. A locking device is provided to lock the vlave member at a position offset from a neutral position to hydraulically bias the cylinder when the input member is steered beyond a predetermined value so that a centering or restoring force is produced to provide a self centering function.

6 Claims, 9 Drawing Figures

VEHICLE CAR STEERING SYSTEM

BACKGROUND OF THE INVENTION

1. Field of the Invention

The present invention relates to a vehicle steering system and more particularly to a hydraulic power assisted vehicle steering system. More specifically, the present invention pertains to a hydraulic power assisted vehicle steering system having a self centering mechanism.

2. Description of the prior Art

It is commonly recognized that conventional vehicle steering systems have a self centering nature due to the caster angles of front wheel arrangements so that the steering mechanism tend to assume a neutral position when the steering force on the steering wheel is relieved. In case of a hydraulic power assisted steering system, however, flow restrictions in the hydraulic system function to resist such self centering movements so that it becomes necessary to apply a manual force to return the steering wheel to the neutral position.

The U.S. Pat. No. 3,373,631 proposes a self centering mechanism for a hydraulic power assisted steering system. According to the proposal, there is provided a cam which is adapted to be rotated in response to a steering movement of the steering shaft. A cam follower roller is provided to be in contact with the cam and forced by a hydraulic piston into engagement with the cam. Thus, the cam is hydraulically forced toward the neutral position whenever the manual steering force on the steering shaft is relieved. In the U.S. Pat. No. 3,426,612, there is also disclosed a similar self centering mechanism for a hydraulic power assisted vehicle steering system. It should be noted that the self centering mechanism as proposed by the above patents are disadvantageous in that complicated cam mechanisms are required.

In Japanese patent application 58-92887 filed on May 26, 1983 and disclosed for public inspection on Dec. 11, 1984 under the disclosure number 59-220455, there is disclosed a hydraulic power assisted vehicle steering system which includes a hydraulic circuit for switching the supply of hydraulic liquid to the power cylinder when the manual steering force on the steering wheel is relieved. The self centering mechanism as proposed by the Japanese patent application is also disadvantageous in that complicated hydraulic circuits are required.

SUMMARY OF THE INVENTION

It is therefore an object of the present invention to provide a hydraulic power assisted vehicle steering system having a self centering mechanism.

Another object of the present invention is to provide a self centering mechanism for a hydraulic power assisted vehicle steering system which is simple and compact in structure.

Still further object of the present invention is to provide a self centering mechanism for a hydraulic power assisted vehicle steering system which can substantially be incorporated in the steering valve mechanism.

According to the present invention, the above and other objects can be accomplished by a power assisted vehicle steering system including an input member connected with a manually operated steering member, an output member connected with a vehicle steering mechanism for transmitting a manual steering force to said vehicle steering mechanism to produce a steering movement in the vehicle steering mechanism, a torsion bar connecting the input member with the output member, a power assist cylinder provided in said vehicle steering mechanism, valve means having valve port means responsive to a relative displacement between the input member and the output member to produce a supply of hydraulic pressure to the power assist cylinder in a direction of assisting the steering movement of the vehicle steering mechanism when the relative displacement is produced between the input member and the output member as a result of a twist of the torsion bar, the improvement comprising the fact that said valve means includes a valve member connected with said output member to be selectively positioned with respect to the output member to one of a neutral position wherein the valve port means is positioned at a neutral position, a first position wherein the valve port means is offset in one direction from the neutral position so that said power assist cylinder is hydraulically biased in a first direction and a second position wherein the valve port means is offset in the other direction from the neutral position so that the power assist cylinder is biased in a second direction, means for holding the valve port means in said first position when the vehicle steering mechanism is steered in the second direction and holding the valve port means in the second position when the vehicle steering mechanism is steered in said first direction.

According to the features of the present invention, a centering bias force is automatically produced when the vehicle steering mechanism is steered. It is preferable that the last mentioned means is operated when the vehicle steering mechanism is steered beyond a predetermined value. For the purpose, steering angle detecting means may be provided. The valve means may include a valve member connected with the output member for movements from the neutral position to one of the first and second positions and the last mentioned means may be detent means for selectively holding the valve member in one of the first and second positions.

The above and other objects and features of the present invention will become apparent from the following descriptions of a preferred embodiment taking reference to the accompanying drawings.

DESCRIPTION OF THE PREFERRED EMBODIMENT

Figure 1:
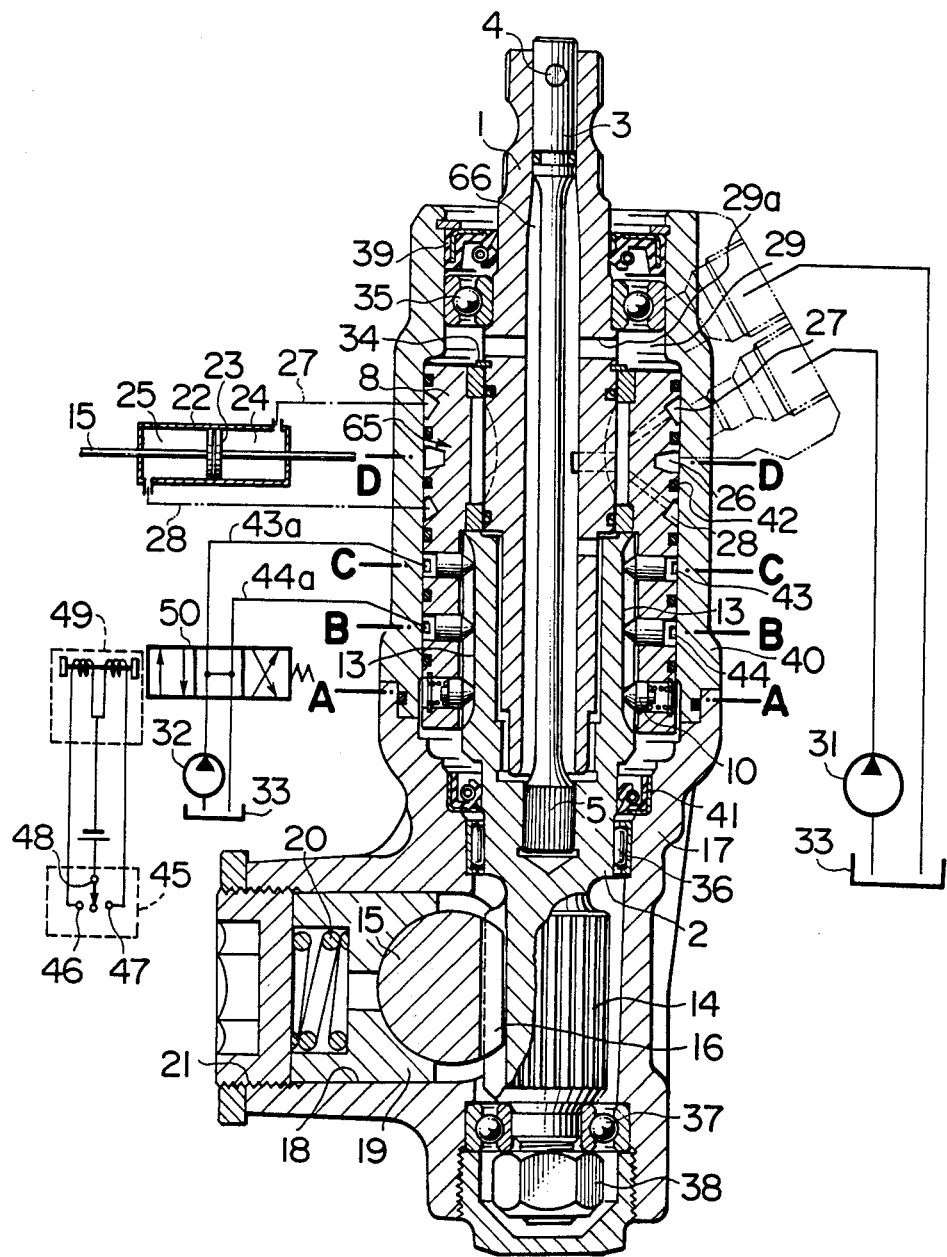
FIG. 1 is a sectional view of a power assist steering control valve mechanism in accordance with one embodiment of the present invention.

Referring to the drawings, particularly to FIG. 1, there is shown a control valve mechanism of a vehicle steering power assist mechanism which includes an input shaft 1 connected with a steering shaft (not shown) which is adapted to be operated by a steering wheel (not shown) as in a conventional steering system. An output member 2 is arranged coaxially with the input member 1 and has one end formed with a pinion 14 which is engaged with rack teeth 16 on a rack bar 15 of a vehicle steering mechanism. The rack bar 15 is supported in a rack housing 17 for an axial sliding movement by means of a support yoke 19. The support yoke 19 is guided in the rack housing 17 along a guide surface 18 for a sliding movement in a direction perpendicular to the axis of the rack bar 15. The support yoke 19 is forced toward the rack bar 15 by means of a spring 20 which acts between the support yoke and a yoke plug 21 fitted to the rack housing 17. The output member 2 is carried rotatably on the rack housing 17 by means of bearings 36 and 37.

Around the input member 1, there is a valve housing 40 which is connected at one end with the rack housing 17. The input member 1 is rotatably supported by the valve housing 40 through a bearing 35. The input member 1 is connected with the output member 2 by means of a torsion bar 3 which has one end secured to the input member 1 through a knock pin 4 and the other end to the output member 2 by a spline 5 formed on the other end of the torsion bar 3.

Figure 5:
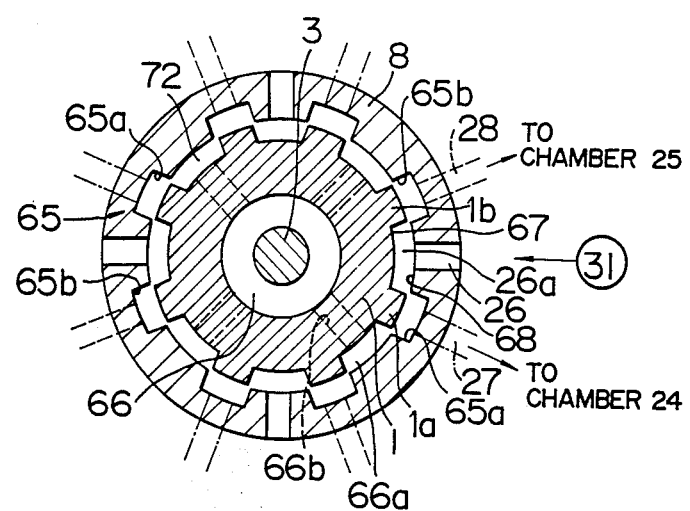
FIG. 5 is a sectional view similar to FIG. 3 but showing parts in the neutral position.

As shown diagrammatically in FIG. 1, there is provided a power assist hydraulic cylinder 22 through which the aforementioned rack bar 15 is passed. In the cylinder 22, the rack bar 15 is formed with a piston 23 which divides the interior of the cylinder 22 into chambers 24 and 25. In order to control hydraulic pressure supply to the cylinder 22, a valve mechanism 65 is provided in the valve housing 40. The valve mechanism 65 includes a hollow cylindrical valve member 8 which is connected at a lower portion with the output member 2. As shown in FIG. 5, the valve member 8 has an inner cylindrical surface 68 which is formed with a plurality of pairs of circumferentially spaced valve ports 65a and 65b. Between each pair of the ports 65a and 65b, there is formed a pressure inlet port 26 which is connected with a hydraulic pump 31. The port 65a is connected through a passage 27 with the chamber 24 of the cylinder 22 whereas the port 65b is connected through a passage 28 with the chamber 25 of the cylinder 22.

Figure 3:
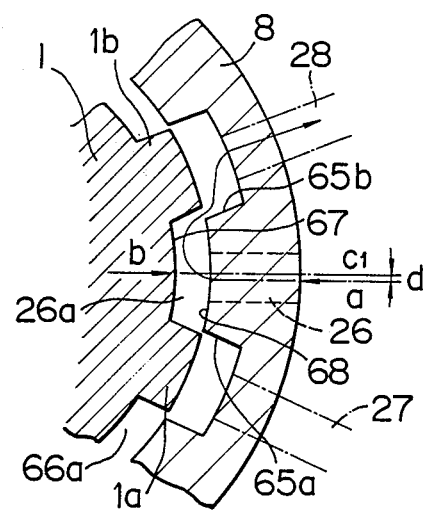
FIG. 3 is a sectional view taken along the line D—D in FIG. 1 showing parts in positions under the condition shown in FIG. 2.

The input member 1 is formed at a portion encircled by the valve member 8 with circumferentially projecting ridges 1a and 1b at positions corresponding to the respective ones of the ports 65a and 65b. The input member 1 is formed at a portion between each pair of the ridges 1a and 1b confronting to the pressure inlet port 26 with a recess 67 which provides a pressure inlet chamber 26a with the inner surface 68 of the valve member 8. The input member 1 is further formed at portions between the ridges 1a and 1b which are not confronting with the pressure inlet ports 26 with return chambers 66a which are connected through radial passages 66b with a return passage 66 formed between the input member 1 and the torsion bar 3. As shown in FIG. 1, the input member 1 is formed with radial passages 29a which connect the return passage 66 with a return chamber 29 formed around the input member 1. The return chamber 29 is connected with an oil reservoir 33. Appropriate seals such as seals 40, 41 and 41a are provided for preventing leakage of the hydraulic pressure. It will therefore be understood that when a relative rotational displacement is produced between the input member 1 and the valve member 8 as shown in FIG. 3, the port 65a is substantially closed by the ridge 1a whereas the port 65b is opened. Thus, the hydraulic pressure is introduced through the passage 28 into the chamber 25 of the cylinder 22. The port 65a is opened to the return chamber 66a so that the chamber 24 in the cylinder 22 is exhausted through the passages 66a and 66 to the return chamber 29. Thus, the power assist cylinder 22 produces an assist force for assisting the steering operation by the steering mechanism.

In a conventional hydraulic power assisting mechanism, the valve member 8 is secured to the output member 2 so that the relative displacement between the input member 1 and the valve member 8 is produced under a twisting deformation of the torsion bar 3 which is substantially proportional to the load on the steering mechanism. Thus, a hydraulic assist power is produced depending on the load on the steering mechanism. However, the conventional power assist steering system does not have any means for automatically returning the steering mechanism to the neutral position.

According to the features of the present invention, the valve member 8 is not secured to the output member 2 but connected thereto for relative rotation within a limited extent. For the purpose, the valve member 8 is formed with guide holes 51 and 53 as shown in FIG. 4 and the output member 2 is provided with guide pins 52 and 54 which are engaged with the guide holes 51 and 53 with certain circumferential clearances.

Figure 4:
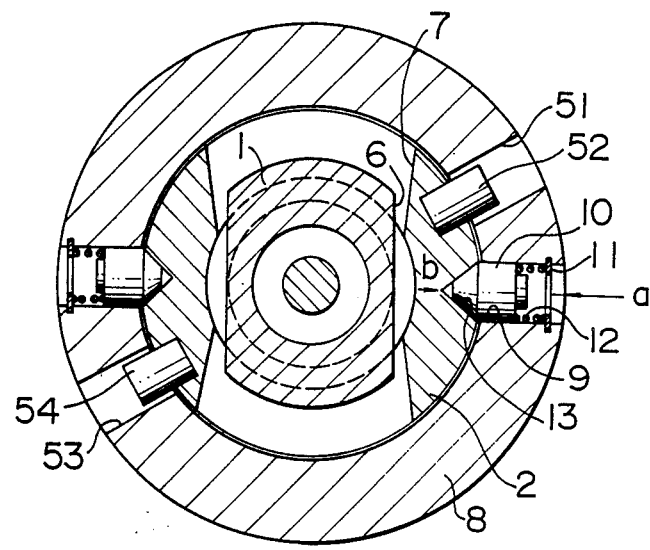
FIG. 4 is a sectional view taken along the line A—A in FIG. 1 with parts in the neutral position.

Referring to FIGS. 1 and 4, it will be noted that the output member 2 is formed at diametrically opposite positions with longitudinally extending grooves 13 of a triangular cross-sectional configuration. The valve member 8 is formed at diametrically opposite positions with cylindrical holes 9 in which neutralizing pistons 10 are slidably received. The piston 10 is formed with a tapered inward end which is adapted to be engaged with the groove 13 in the output member 2. The piston 10 is forced radially inward of the output member 2 by a spring 12 which acts between the outer end of the piston 10 and a spring retainer 11. The grooves 13 and the pistons 10 are located so that when the pistons 10 are fully inserted into the grooves 13 the valve member 8 is secured to the output member 2 at a predetermined position.

Figure 2:
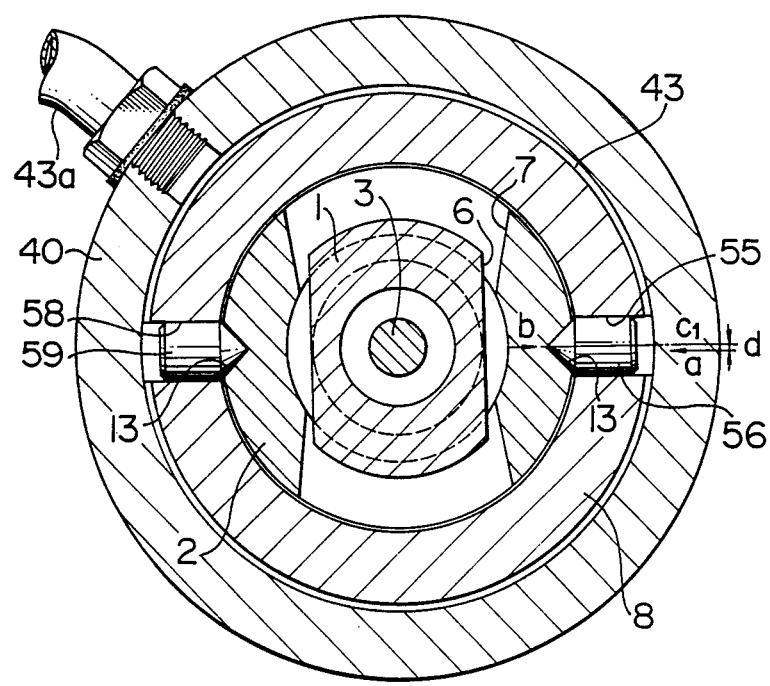
FIG. 2 is a sectional view taken along the line C—C in FIG. 1 with parts in positions wherein the steering force is relieved after a leftward steering effort.
Figure 9:
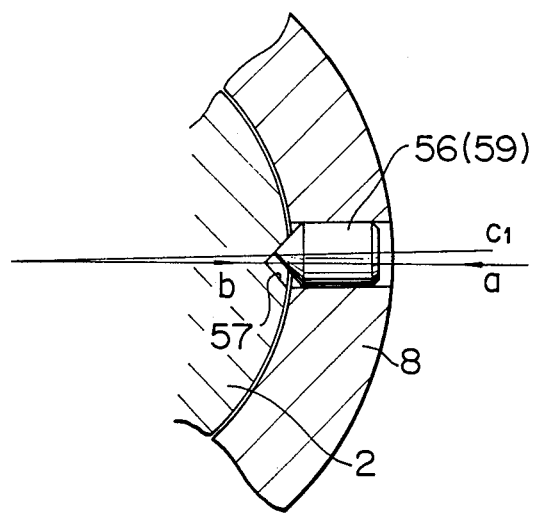

Referring to FIG. 2, it will further be noted that the valve member 8 is formed at diametrically opposite positions with cylindrical holes 55 and 58 which have axes C1 circumferentially offset from the axes a of the holes 9 for the neutralizing pins 10 by a circumferential distance d. The holes 55 and 58 slidably receive offset pins 56 and 59, respectively. The pins 56 and 59 have tapered ends which are adapted to be engaged with the grooves 13, however, due to the aforementioned circumferential offset, the pins 56 and 59 are not fully engaged with the grooves 13 as shown in FIG. 9 in the neutral position wherein the pins 10 are fully engaged with the grooves 13. At the axial position of the valve member 8 where the pin receiving holes 55 and 58 are formed, the valve member 8 is formed at an outer surface with a circumferential groove 43 which is connected with a hydraulic line 43a as shown in FIG. 1.

Figure 6:
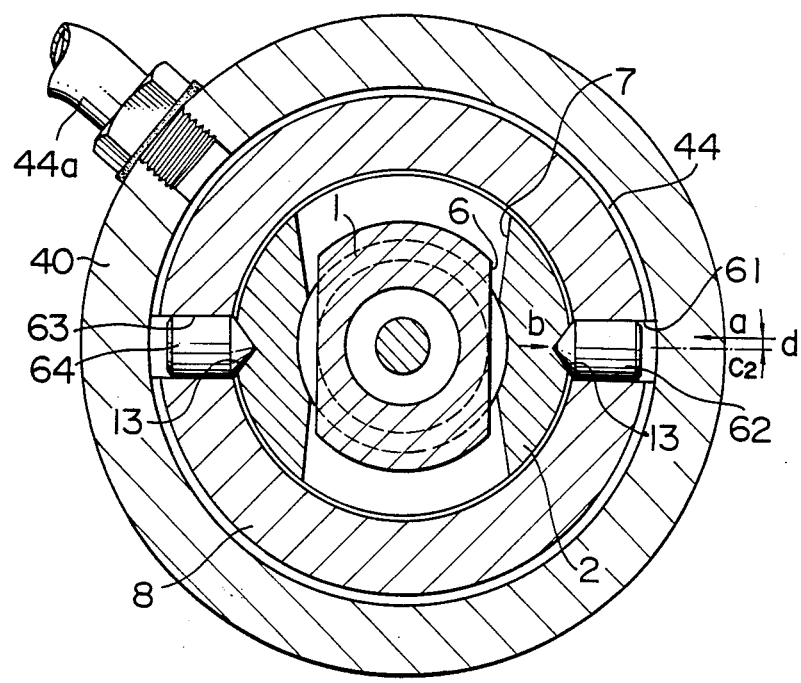
FIG. 6 is a sectional view taken along the line B—B in FIG. 1 with parts in positions wherein the steering force is relieved after a rightward steering efforts.
Figure 7:
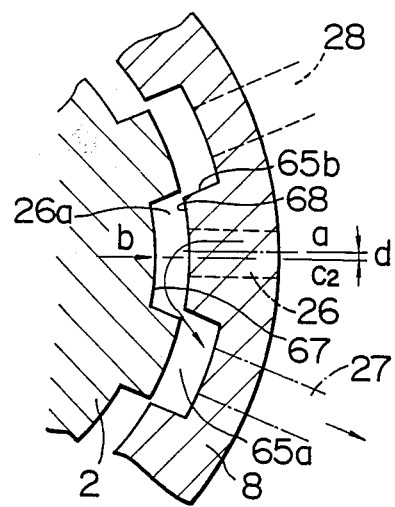
FIG. 7 is a fragmentary sectional view showing the self centering function.

Referring now to FIG. 6, it will be noted that the valve member 8 is further formed at diametrically opposite positions axially offset from the holes 55 and 59 with radially directed holes 61 and 63 having axes C2 circumferentially offset from the axes a of the holes 9 by a circumferential distance d in the direction opposite to the offset direction of the holes 55 and 59. The holes 61 and 63 receive offset pins 62 and 64, respectively, which have tapered ends for engagement with the grooves 13. As in the case of the pins 56 and 59, the pins 62 and 64 are not fully engaged with the grooves 13 in the neutral position. The valve member 8 is formed at an outer surface in an axial position where the holes 61 and 63 are formed with a circumferential groove 44 which is connected with a hydraulic line 44a. The hydraulic lines 43a and 44a are connected with an auxiliary hydraulic pump 32 through an electromagnetic solenoid valve 50. When the valve 50 is in the position shown in FIG. 1, the valve 50 blocks the lines 43a and 44a from the pump 32. When the valve 50 is shifted toward right in FIG. 1, the line 43a is connected with the pump 32 and the line 44a is opened to the reservoir 33. Thus, the hydraulic pressure is introduced into the groove 43 to thereby force the pistons 56 and 59 toward the grooves 13. The valve member 8 is then rotationally shifted by the circumferential distance d overcoming the force applied to the neutralizing pistons 10 by the springs 12. When the valve 50 is shifted so that the line 44a is connected with the pump 32 and the line 43a is opened to the reservoir 33, the hydraulic pressure is applied to the groove 44 so that the valve member 8 is rotationally shifted in the opposite direction.

In order to produce shifting operations of the valve 50, the valve 50 is provided with solenoid coils 49 which are connected with a steering detector 45 having contacts 46 and 47 and a movable contact arm 48. The movable contact arm 48 is actuated by the input member 1 or another member which is mechanically connected with the input member 1 so that when the input member 1 is moved in either of the two directions beyond a predetermined angle, the movable contact arm 48 is engaged with one of the contacts 46 and 47 to thereby shift the valve 50 in an appropriate direction.

In order to limit the relative angular displacement between the input member 1 and the output member 2, the input member 1 is formed at diametrically opposite sides with flat surfaces 6. The output member 2 is formed with stop surfaces 7 which are located to engage the surfaces 6 on the input member 1 when the output member 2 is angularly shifted with respect to the input member 1 by a predetermined angular distance.

Figure 8:
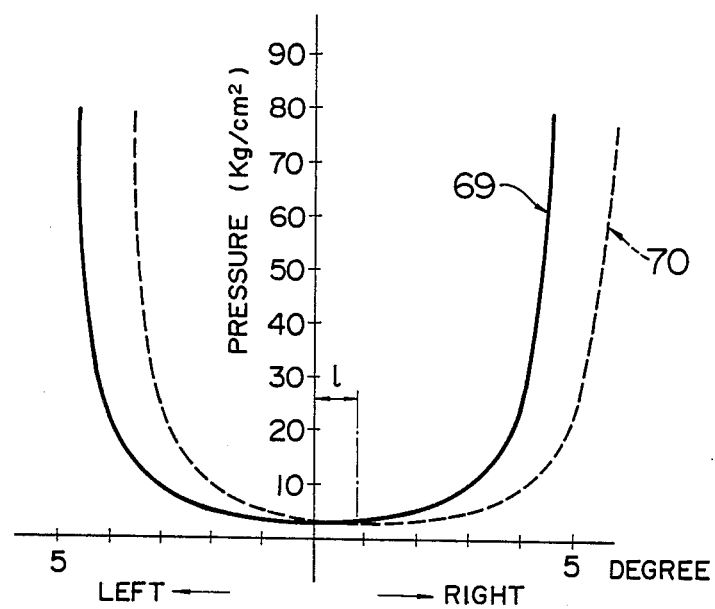
FIG. 8 is a diagram showing the relationship between the valve displacement angle and the hydraulic pressure; and, FIG. 9 is a sectional view showing the self centering mechanism in the neutral position.

In operation, when the input member 1 is manually rotated to produce a steering movement in the vehicle steering mechanism, the torsion bar 3 is twisted by an amount corresponding to the load on the steering mechanism. At the initial position, the neutralizing pins 10 are fully engaged with the grooves 13, so that the valve member 8 is fixed to the output member 2 at the neutral position. Thus, a relative angular displacement is produced between the input member 1 and the valve member 8 in the direction shown in FIG. 3 or in the opposite direction depending on the direction of the steering movement to produce a hydraulic power assist force as shown by a solid line 69 in FIG. 8. When the steering angle exceeds a predetermined value, the movable contact arm 48 is engaged with one of the contacts 46 and 47 depending on the direction of the steering movement so that the valve 50 is shifted as described previously. Thus, the offset pins 56 and 59 or 62 and 64 are hydraulically forced into the groove 13 to angularly offset the valve member 8 with respect to the output member 2. Under this condition, the hydraulic assist force changes as shown for example by a dotted line 70 in FIG. 8.

When the steering force on the input member is relieved, the torsion bar 3 restores its original position so that the relative angular displacement between the input member 1 and the output member 2 is eliminated. In this position, the valve member 8 remains in the offset position as far as the steering mechanism is in a steered position beyond the predetermined angle. Therefore, the pressure inlet chamber 26a is opened more widely to one of the ports 65a and 65b than to the other. For example, when the steering force is applied so that the hydraulic pressure is introduced through the passage 28 into the chamber 25 of the power cylinder 22 as shown in FIG. 3, the pressure inlet chamber 26a is opened more widely to the port 65a leading to the passage 27 when the steering force is relieved. Therefore, a slight hydraulic pressure is introduced through the passage 27 into the chamber 24 of the power cylinder 22 to produce a hydraulic force in the direction opposite to the direction of the steering. Thus, a restoring or centering force is hydraulically produced to center the steering mechanism. It will be noted that the arrangement is compact and can be incorporated substantially in the control valve mechanism of the hydraulic power assist mechanism.

The invention has thus been shown and described with reference to a specific embodiment, however, it should be noted that the invention is in no way limited to the details of the illustrated structures but changes and modifications may be made without departing from the scope of the appended claims.

I claim:

1. A power assisted vehicle steering system including an input member connected with a manually operated steering member, an output member connected with a vehicle steering mechanism for transmitting a manual steering force to said vehicle steering mechanism to produce a steering movement in the vehicle steering mechanism, a torsion bar connecting the input member with the output member, a power assist cylinder provided in said vehicle steering mechanism, valve means having valve port means responsive to a relative displacement between the input member and the output member for producing a supply of hydraulic pressure to the power assist cylinder in a direction of assisting the steering movement of the vehicle steering mechanism when the relative displacement is produced between the input member and the output member as a result of a twist of the torsion bar, the improvement comprising the fact that said valve means includes a valve member means connected with said output member for selective positioning with respect to the output member to one of a neutral position wherein the valve port means is positioned at a neutral position, a first position wherein the valve port means is offset in one direction from the neutral position so that said power assist cylinder is hydraulically biased in a first direction and a second position wherein the valve port means is offset in the other direction from the neutral position so that the power assist cylinder is biased in a second direction, means for holding the valve port means in said first position when the vehicle steering mechanism is steered in the second direction and holding the valve port means in the second position when the vehicle steering mechanism is steered in said first direction.

2. A vehicle steering system in accordance with claim 1 in which said holding means includes detecting means for detecting direction and amount of steering movement applied to said input member and means for shifting said valve port means in accordance with the direction of the steering movement detected by the detecting means when the steering movement is produced beyond a predetermined value.

3. A vehicle steering system in accordance with claim 1 in which said holding means includes locking means for hydraulically locking said valve port means with respect to the output member.

4. A vehicle steering system in accordance with claim 2 in which said holding means includes first locking means for hydraulically locking said valve port means in said first position with respect to the output member, second locking means for hydraulically locking said valve port means in said second position, and valve means for applying hydraulic pressure to said locking means to lock said valve port means in said first position when said input member is steered in said second direction beyond said predetermined value and in said second position when said input member is steered in said first direction beyond said predetermined value.

5. A hydraulic power assisted vehicle steering system comprising an input member, an output member coaxial with said input member, a torsion bar connecting said input member with said output member so that a steering effort manually applied to said input member is transmitted to said output member, said output member being connected with a vehicle steering mechanism so that a steering movement is produced in said steering mechanism in accordance with the steering effort applied to said input member, a hydraulic power assist cylinder provided in said vehicle steering mechanism, a hydraulic pressure source, control valve means provided between said input and output members and responsive to a relative movement between said input and output members as a result of a twisting deformation of the torsion bar for selectively applying a hydraulic pressure to said cylinder means in accordance with a direction of said steering effort applied to the input member to thereby produce a hydraulic assist power, said control valve means including a valve member means connected with said output member for an angular displacement so that the valve member can be positioned in a neutral position, a first position angularly offset in one direction from the neutral position so that a biasing hydraulic pressure is applied to said cylinder means in a first direction and a second position angularly offset in the other direction from the neutral position so that a biasing hydraulic pressure is applied to said cylinder means in a second direction, hydraulic locking means for locking said valve member in said first position when the input member is steered in the second direction and in said second position when the input member is steered in the first direction.

6. A vehicle steering system in accordance with claim 5 in which said hydraulic locking means includes recess means formed in said valve member, locking pin means provided in said output member and adapted to be actuated by a hydraulic pressure and switching valve means for selectively applying the hydraulic pressure to said locking pin means.

* * * * *